US011359542B2

(12) United States Patent
Gardes et al.

(10) Patent No.: US 11,359,542 B2
(45) Date of Patent: Jun. 14, 2022

(54) TURBOFAN ENGINE COMPRISING A SET OF ROTATABLE BLADES FOR BLOCKING OFF THE BYPASS FLOW DUCT AND REDIRECTING THE AIR FLOW

(71) Applicant: Airbus Operations SAS, Toulouse (FR)

(72) Inventors: Pascal Gardes, Toulouse (FR); Fabien Menou, Toulouse (FR); Pascal Gougeon, Toulouse (FR); Simon Vanderbauwede, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/199,960

(22) Filed: Mar. 12, 2021

(65) Prior Publication Data

US 2021/0285372 A1    Sep. 16, 2021

(30) Foreign Application Priority Data

Mar. 16, 2020 (FR) ...................................... 2002535

(51) Int. Cl.
*F02C 6/20* (2006.01)
*F02C 9/18* (2006.01)
(Continued)

(52) U.S. Cl.
CPC ................ *F02C 6/206* (2013.01); *F02C 9/18* (2013.01); *F02K 1/64* (2013.01); *F02K 1/70* (2013.01);
(Continued)

(58) Field of Classification Search
CPC .... F02C 6/206; F02C 9/18; F02K 1/64; F02K 1/70; F02K 1/72; F04D 29/524; F05D 2220/323
See application file for complete search history.

(56) References Cited

U.S. PATENT DOCUMENTS

| 2,933,890 A | 4/1960 | Morrison |
| 4,026,105 A | 5/1977 | James |
| (Continued) | | |

FOREIGN PATENT DOCUMENTS

| EP | 3540203 A1 | 9/2019 |
| FR | 3078999 A1 | 9/2019 |

OTHER PUBLICATIONS

French Search Report; priority document.

*Primary Examiner* — Ehud Gartenberg
*Assistant Examiner* — Henry Ng
(74) *Attorney, Agent, or Firm* — Greer, Burns & Crain, Ltd.

(57) ABSTRACT

An engine including a motor and a nacelle and a duct between the nacelle and the motor. The nacelle includes a fixed structure, a mobile assembly that is mobile between an advanced position and a retracted position to define a window between the duct and the outside, and a plurality of blades that are mobile in rotation between a stowed position and a deployed position, each one extending on either side of its axis of rotation with a first arm and a second arm. In the stowed position, the first arm is outside the duct and the second arm is inside the nacelle, and where, in the deployed position, the first arm is across the duct and the second arm projects out of the nacelle. With such blades, the flow of air is optimally directed towards the front without it being necessary to provide cascades.

4 Claims, 4 Drawing Sheets

(51) Int. Cl.
*F04D 29/52* (2006.01)
*F02K 1/72* (2006.01)
*F02K 1/64* (2006.01)
*F02K 1/70* (2006.01)

(52) U.S. Cl.
CPC ............ *F02K 1/72* (2013.01); *F04D 29/524* (2013.01); *F05D 2220/323* (2013.01)

(56) References Cited

U.S. PATENT DOCUMENTS

| | | | |
|---|---|---|---|
| 4,030,290 A | 6/1977 | Stachowiak | |
| 8,151,551 B2* | 4/2012 | Pero | F02K 1/70 60/226.3 |
| 10,563,615 B2* | 2/2020 | Howarth | F02K 1/70 |
| 10,830,089 B2* | 11/2020 | Gardes | F02K 1/72 |
| 11,105,297 B2* | 8/2021 | Gardes | F16H 25/18 |
| 11,187,190 B2* | 11/2021 | Cazeaux | F02K 1/763 |
| 11,193,379 B2* | 12/2021 | Gardes | F02K 1/72 |
| 11,220,978 B2* | 1/2022 | Gardes | F02K 1/09 |
| 2013/0067884 A1* | 3/2013 | Bhatt | F02K 1/72 60/204 |
| 2015/0369078 A1* | 12/2015 | Sawyers-Abbott | F01D 17/14 415/128 |
| 2018/0087474 A1* | 3/2018 | Chuck | F02K 1/70 |
| 2018/0313297 A1* | 11/2018 | Surply | B64D 27/16 |
| 2018/0372025 A1* | 12/2018 | Ridray | F02K 1/72 |
| 2019/0002118 A1* | 1/2019 | Nestico | B64D 27/16 |
| 2019/0284952 A1 | 9/2019 | Gardes et al. | |
| 2020/0325785 A1* | 10/2020 | Gardes | F01D 25/24 |
| 2020/0325848 A1* | 10/2020 | Gardes | F02K 1/09 |
| 2020/0378340 A1* | 12/2020 | Cousin | F02K 1/763 |

* cited by examiner

TURBOFAN ENGINE COMPRISING A SET OF ROTATABLE BLADES FOR BLOCKING OFF THE BYPASS FLOW DUCT AND REDIRECTING THE AIR FLOW

CROSS-REFERENCES TO RELATED APPLICATIONS

This application claims the benefit of the French patent application No. 2002535 filed on Mar. 16, 2020, the entire disclosures of which are incorporated herein by way of reference.

FIELD OF THE INVENTION

The present invention relates to a turbofan engine which comprises a set of blades which are mounted so as to be able to rotate in order to block the duct for the bypass flow and where each blade has a shape that can serve to redirect the flow of air towards the front of the engine, and to an aircraft comprising at least one such turbofan engine.

BACKGROUND OF THE INVENTION

An aircraft includes a fuselage, to each side of which is fixed a wing. Under each wing is suspended at least one turbofan engine. Each turbofan engine is fixed under the wing by means of a pylon fixed between the structure of the wing and the structure of the turbofan engine.

The turbofan engine comprises a motor and a nacelle that is fixed around the motor. The turbofan engine has, between the nacelle and the motor, a bypass duct in which a bypass flow flows.

In patent application FR-A-3 078 999, the nacelle further comprises a set of blades which are mounted so as to be able to rotate in order to block the bypass duct and direct the flow of air from said bypass duct towards the outside, through cascades arranged across a window.

Although such an arrangement yields good results as regards the weight of the mechanism, it is necessary to provide cascades in order to direct the flow of air leaving the window, which implies additional weight, and it is therefore necessary to find an arrangement that can serve to best direct the flow of air leaving the window while making it possible to save weight.

SUMMARY OF THE INVENTION

One aim of the present invention is to propose a turbofan engine which comprises a set of blades which are mounted so as to be able to rotate in order to block the duct for the bypass flow and where each blade has a shape that can serve to redirect the flow of air towards the front.

To that end, a turbofan engine is proposed, with rotatably mobile blades. With such blades, the flow of air is optimally directed towards the front without it being necessary to provide cascades.

BRIEF DESCRIPTION OF THE DRAWINGS

The abovementioned features of the invention, along with others, will become more clearly apparent upon reading the following description of an exemplary embodiment, said description being given with reference to the appended drawings, in which.

DETAILED DESCRIPTION OF THE PREFERRED EMBODIMENTS

In the following description, the terms relating to a position refer to the direction of advance of the aircraft and the air in an engine therefore flows from the front to the rear of the aircraft.

Figure 1:
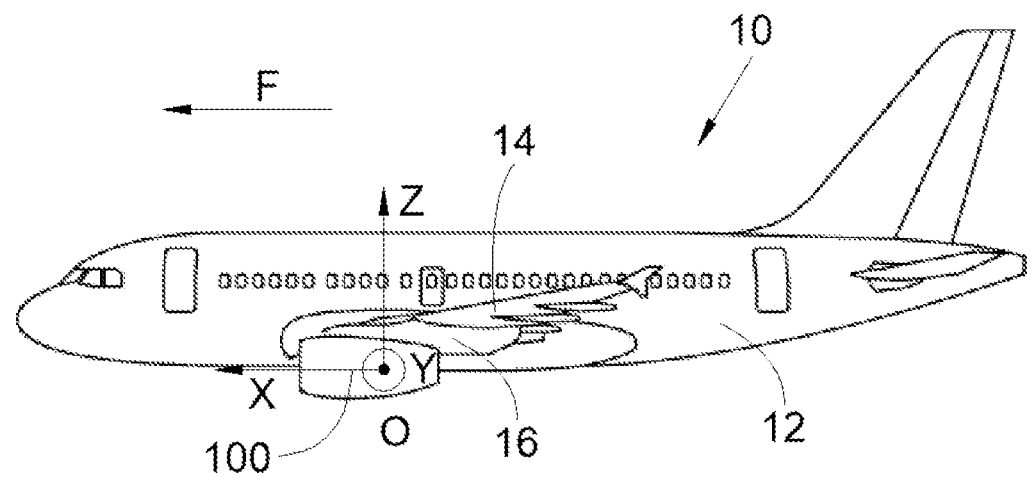
FIG. 1 is a side view of an aircraft comprising a turbofan engine according to the invention.

FIG. 1 shows an aircraft 10 that comprises a fuselage 12, to each side of which is fixed a wing 14 that bears at least one turbofan engine 100 according to the invention. The turbofan engine 100 is fixed under the wing 14 by means of a pylon 16. The arrow F of FIG. 1 shows the direction of advance of the aircraft 10 and the air therefore flows in the opposite direction in the turbofan engine 100.

Figure 2:
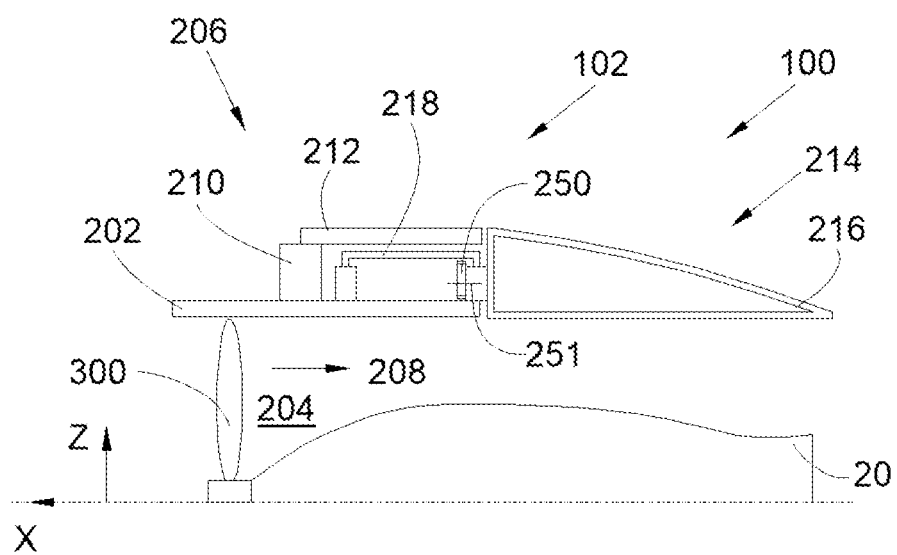
FIG. 2 is a schematic side view of a turbofan engine according to the invention, with the blades in the stowed position.
Figure 3:
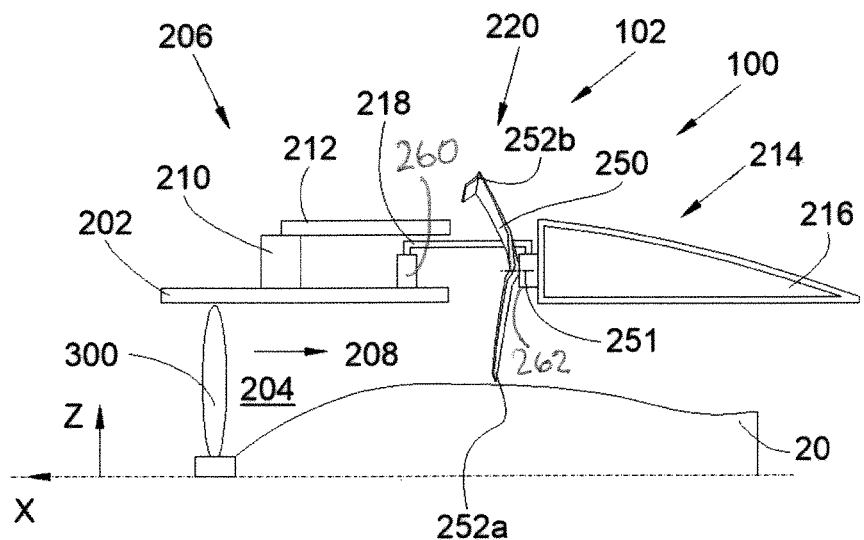
FIG. 3 is a view similar to the view of FIG. 2, with the blades in the deployed position.

FIGS. 2 and 3 show the turbofan engine 100 which has a nacelle 102 and a motor 20 which is housed inside the nacelle 102 and which comprises a fan casing 202.

In the following description, and by convention, X denotes the longitudinal axis of the turbofan engine 100 that is parallel to the longitudinal axis of the aircraft 10 oriented positively towards the front of the aircraft 10, Y denotes the transverse axis that is horizontal when the aircraft is on the ground, and Z denotes the vertical axis, these three directions X, Y and Z being mutually orthogonal.

The turbofan engine 100 has, between the nacelle 102 and the motor 20, a duct 204 in which flows a bypass flow 208 coming from an air intake of the turbofan engine 100 through a fan 300, and which therefore flows in a flow direction from front to rear of the turbofan engine 100. The fan 300 is arranged inside the fan casing 202.

The nacelle 102 has a fixed structure 206 that is mounted fixed on the fan casing 202. The fixed structure 206 is made up, in particular, of a front frame 210 mounted around the fan casing 202 and of outer panels 212 around the fan casing 202.

The nacelle 102 has a mobile assembly 214 having a mobile cowl 216 forming the walls of the nozzle and a slider 218 which is, for example, in the form of a cylinder having openwork walls. The mobile cowl 216 is fixed to and at the rear of the slider 218.

The slider 218 is mounted mobile in translation in a translation direction globally parallel to the longitudinal axis X on the fixed structure 206 of the nacelle 102.

The slider 218 is mobile between an advanced position (FIG. 2) and a retracted position (FIG. 3) and vice versa. In the advanced position, the slider 218 is positioned as far forward as possible, such that the mobile cowl 216 is moved close to the outer panels 212 and to the fan casing 202. In the retracted position, the slider 218 is positioned as far aft as possible, such that the mobile cowl 216 is moved away, to the rear, from the outer panels 212 and from the fan casing 202 so as to define, between them, a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the retracted position, the mobile cowl 216 and the fan casing 202, and also the outer panels 212, are spaced apart from one another and define, between them, the window 220 which is open between the duct 204 and the exterior of the nacelle 102. That is to say, the air from the secondary flow 208 passes through the window 220 to end up outside the turbofan engine 100.

The slider 218 is made to translate by any appropriate means, such as slideways between the front frame 210 and the slider 218.

The slider 218 is driven in translation by any appropriate means, such as a drive assembly 260, for example, actuators controlled by a control unit, such as a controller, for example of the processor type, which orders movements in one direction or another depending on the requirements of the aircraft 10. Each actuator may, for example, be a double-action jack (two working directions) fixed between the fixed structure 206 and the slider 218.

Thus, translation and driving in translation are brought about by any appropriate drive assembly 260.

The fan casing 202 and the outer panels 212 delimit the front of the window 220, and the mobile cowl 216 delimits the rear of the window 220.

The nacelle 102 comprises a plurality of blades 250, each being mounted so as to be able to rotate on the slider 218 about an axis of rotation 251 that is generally parallel to the longitudinal axis X.

Figure 4:
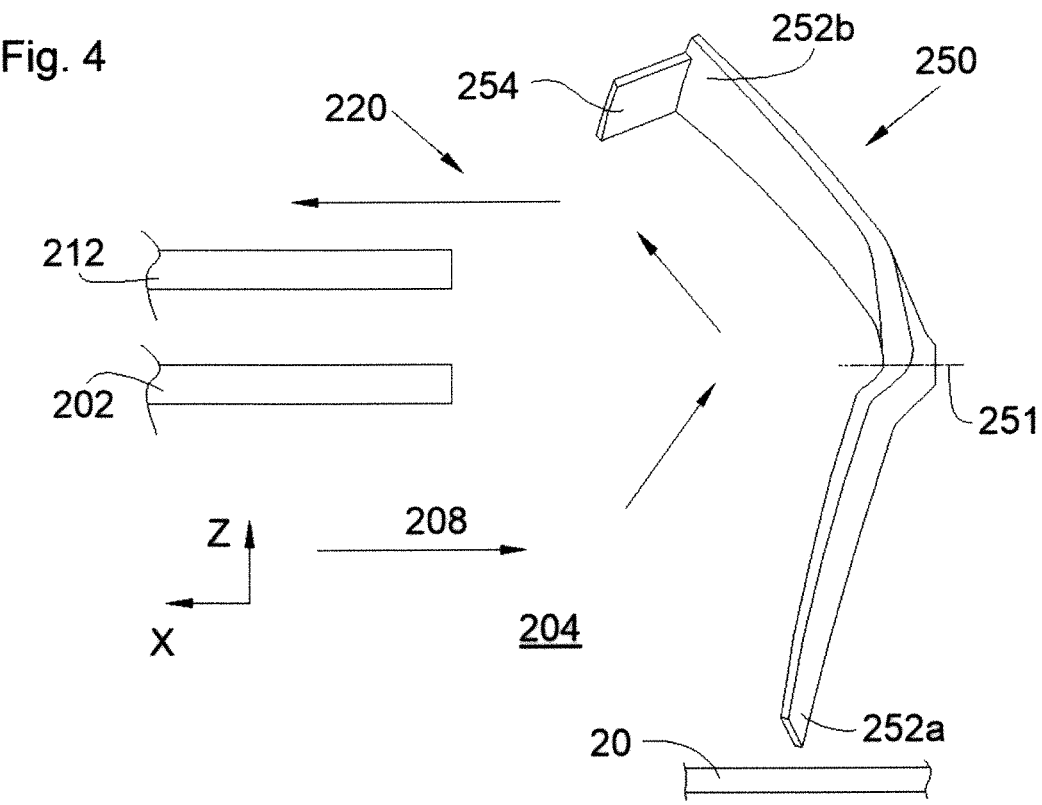
FIG. 4 is a perspective view of a blade according to the invention, in the deployed position.
Figure 5:
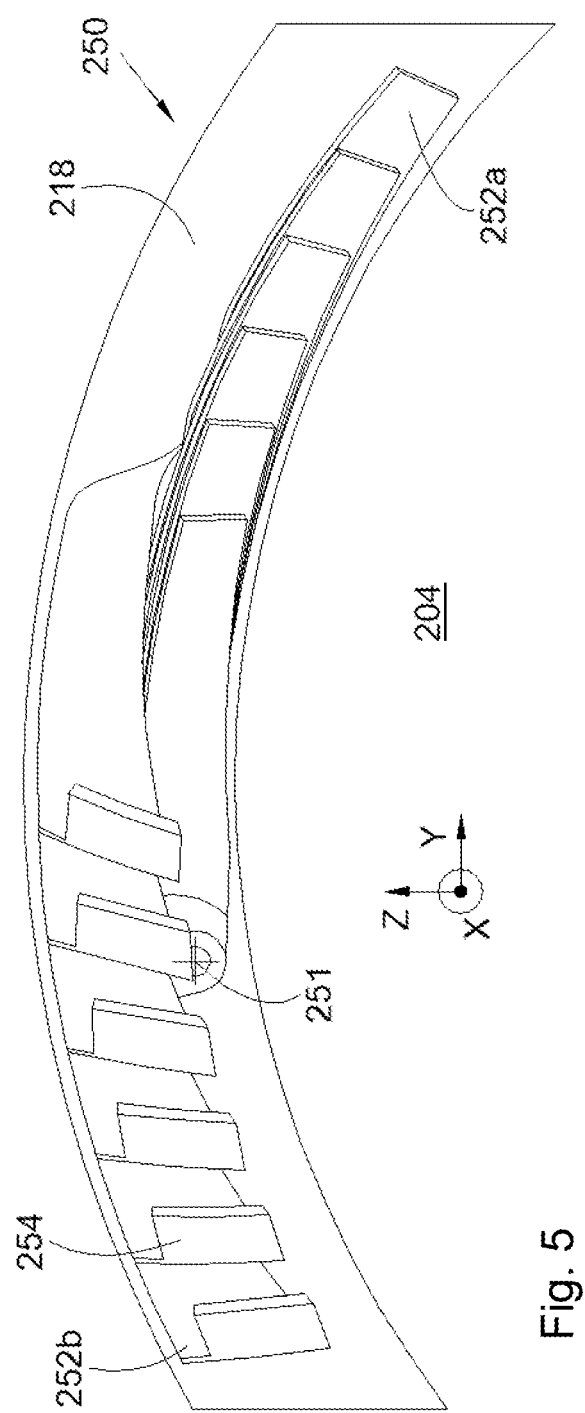
FIG. 5 is a front view of blades in the stowed position.
Figure 6:
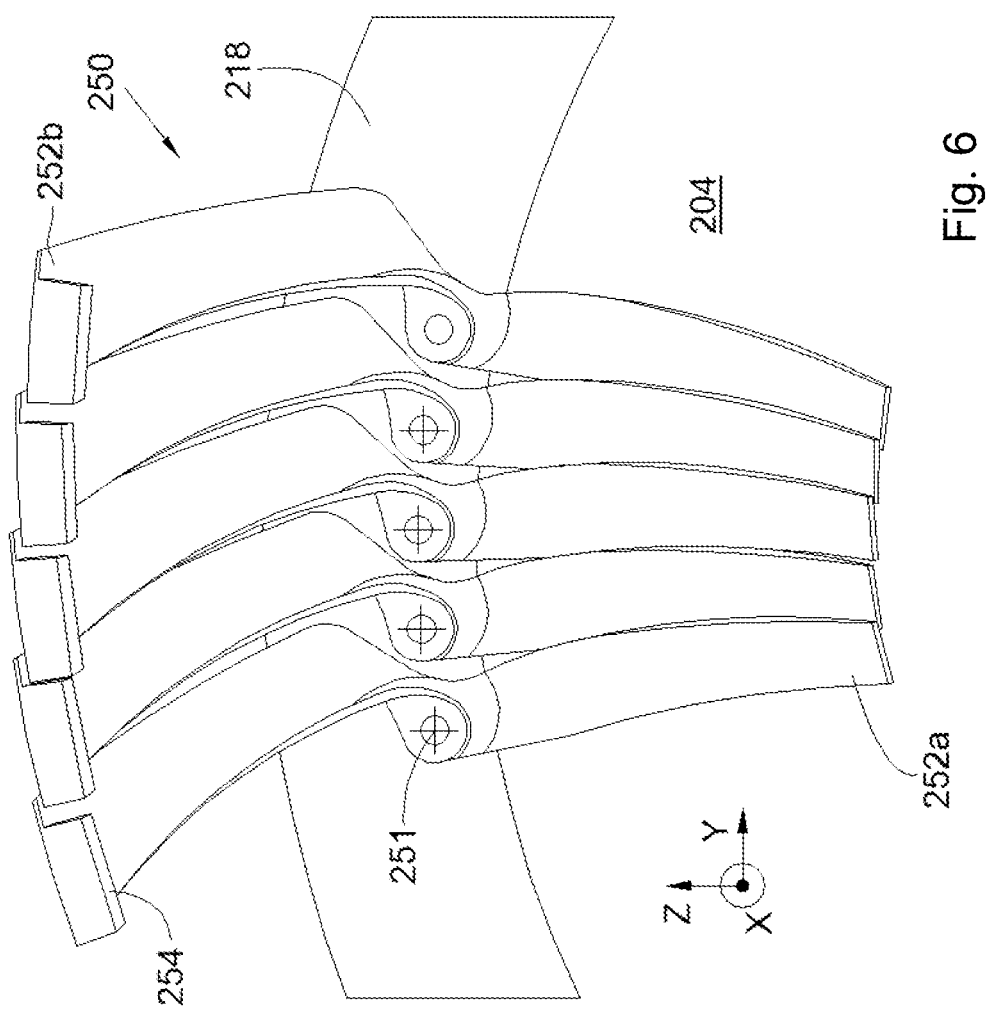
FIG. 6 is a front view of blades in the deployed position.

FIG. 4 shows a blade 250 according to the invention, and FIGS. 5 and 6 show blades in two positions of use.

Each blade 250 extends on either side of its axis of rotation 251, with a first arm 252a and a second arm 252b that extends in the opposite direction from the first arm 252a.

Thus, each blade 250 is able to move in rotation between a stowed position (FIGS. 2 and 5) and a deployed position (FIGS. 3, 4 and 6).

In the stowed position, the first arm 252a is outside the duct 204 and the second arm 252b is stowed inside the nacelle 102.

In the deployed position, the first arm 252a is across the duct 204 in order to redirect the bypass flow 208 towards the window 220 and the second aim 252b projects out of the nacelle 102 to guide the bypass air flow 208 to the outside. Thus, in the deployed position, the first arm 252a is moved closer to the motor 20 so as to best obstruct the duct 204, and the free end of the second arm 252b leaves the nacelle 102 through the window 220.

Each blade 250 is, in this case, mounted on a perimeter of the slider 218. When the blades 250 are in the stowed position, they are superposed in the direction of the longitudinal axis X, in groups, one on top of the other, so as to align in a generally circular shape as shown in FIG. 5, in which only some blades 250 are shown.

The number of blades 250 depends on the dimensions of the turbofan engine 100 in order that, in the deployed position, the blades 250 block the majority of the duct 204.

The movement in rotation of each blade 250 from the stowed position to the deployed position and vice versa is brought about by any appropriate maneuvering systems 262. This may, for example, be a maneuvering system 262 borne by the slider 218 and intended to move each blade 250 from the stowed position to the deployed position and vice versa. The maneuvering system 262 is controlled by the control unit. The maneuvering system 262 may, for example, be a motorized rack-and-pinion system such as that described in document FR-A-3 078 999, and incorporated herein by reference, or any other appropriate mechanical system.

Thus, the passage from the stowed position to the deployed position is brought about by a rotation of the blade 250 so as to move the first arm 252a towards the inside of the turbofan engine 100, and the second arm 252b towards the outside of the nacelle 102.

The stowed position can be adopted when the slider 218 is in the advanced position or the retracted position. The deployed position can be adopted only when the slider 218 is in the retracted position.

Thus, operation comprises, starting from the advanced/stowed position, ordering movement of the slider 218 from the advanced position to the retracted position, then commanding the maneuvering system 262 to move each blade 250 from the stowed position to the deployed position.

Conversely, operation thus comprises, starting from the retracted/deployed position, commanding the maneuvering system 262 to move each blade 250 from the deployed position to the stowed position, then ordering movement of the slider 218 from the retracted position to the advanced position.

The presence of the second aim 252b, which extends through the window 220 to the outside of the nacelle 102, makes it possible to dispense with cascades, and thus to make the assembly more lightweight.

In order to best guide the bypass air flow 208, the first arm 252a extends from front to rear progressing from its free end towards its axis of rotation 251, and the second arm 252b extends from rear to front progressing from its axis of rotation 251 towards its free end. As shown in FIG. 4, such a shape serves to bring about a progressive change of direction of the bypass air flow 208.

In order to force the bypass air flow 208 even more towards the front as it leaves the nacelle 102, the second arm 252b comprises, at its free end, an aileron 254 that extends towards the front in a plane that is generally parallel to the longitudinal axis X.

The invention has been more particularly described in the case of a nacelle under a wing but can be applied to a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan engine having a longitudinal axis and comprising a motor and a nacelle, surrounding the motor, which comprises a fan casing, in which a duct for a bypass flow is delimited between the nacelle and the motor and in which a flow of air flows in a flow direction from front to rear, said nacelle comprising:
  a fixed structure fixed to the fan casing,
  a mobile assembly having a mobile cowl and a slider, the mobile cowl being fixed to and aft of the slider, the slider being mobile in translation, on the fixed structure, in a direction of translation between an advanced position in which the slider is positioned such that the mobile cowl is moved close to the fan casing and a retracted position in which the slider is positioned such that the mobile cowl is moved away from the fan casing so as to define, between them, an open window between the duct and an exterior of the nacelle, a plurality of blades, each one being mobile in rotation on the slider about an axis of rotation that is generally parallel to the longitudinal axis between a stowed position and a deployed position, each one extending on either side of its axis of rotation with a first arm and a second arm, where, in the stowed position, the first arm is outside the duct and the second arm is stowed inside the nacelle, and where, in the deployed position, the first arm is across the duct and the second arm projects out of the exterior of the nacelle, a drive assembly causing the slider to move between the advanced position and the retracted position, and vice versa, and a maneuvering system configured to move each blade of the plurality of blades from the stowed position to the deployed position and vice versa.

2. The turbofan engine according to claim 1, wherein the first arm extends from front to rear progressing from a free end of the first arm towards the axis of rotation, and wherein the second arm extends from rear to front progressing from the axis of rotation towards a free end of the second arm.

3. The turbofan engine according to claim 2, wherein the second arm comprises, at the free end of the second arm, an aileron that extends towards the front in a plane that is generally parallel to the longitudinal axis.

4. An aircraft comprising at least one of the turbofan engine according to claim 1.

\* \* \* \* \*